(12) United States Patent
Baumgartner et al.

(10) Patent No.: US 6,658,030 B1
(45) Date of Patent: Dec. 2, 2003

(54) LASER SAFETY METHOD AND DEVICE FOR DUPLEX OPEN LOOP PARALLEL OPTICAL LINK

(75) Inventors: Steven John Baumgartner, Zumbro Falls, MN (US); Daniel Scott Hedin, Rochester, MN (US); Matthew James Paschal, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 09/618,221

(22) Filed: Jul. 18, 2000

(51) Int. Cl.[7] ................................................. H01S 3/13
(52) U.S. Cl. ........................ 372/29.021; 372/29.02; 359/152
(58) Field of Search .................... 372/29.02, 29.021; 359/152

(56) References Cited

U.S. PATENT DOCUMENTS

| | | | | |
|---|---|---|---|---|
| 5,465,106 A | * | 11/1995 | Keech et al. ............... 345/204 |
| 5,509,122 A | * | 4/1996 | Bartow et al. .......... 395/200.15 |
| 5,956,168 A | * | 9/1999 | Levinson et al. ............ 359/152 |
| 6,195,371 B1 | * | 2/2001 | Haneda et al. ............ 372/29.01 |
| 6,359,708 B1 | | 3/2002 | Goel et al. |
| 6,359,713 B1 | * | 3/2002 | DeCusatis et al. .......... 359/179 |

FOREIGN PATENT DOCUMENTS

| EP | 1 006 682 A2 | 6/2000 |
|---|---|---|
| EP | 1 130 804 A1 | 9/2001 |

\* cited by examiner

*Primary Examiner*—Paul Ip
*Assistant Examiner*—Leith A Al-Nazer
(74) *Attorney, Agent, or Firm*—Rabin & Berdo, PC (57) ABSTRACT

A method and apparatus are provided to ensure that laser optical power does not exceed a "safe" level in an open loop parallel optical link in the event that a fiber optic ribbon cable is broken or otherwise severed. A duplex parallel optical link includes a transmitter and receiver pair and a fiber optic ribbon that includes a designated number of channels that cannot be split. The duplex transceiver includes a corresponding transmitter and receiver that are physically attached to each other and cannot be detached therefrom, so as to ensure safe, laser optical power in the event that the fiber optic ribbon cable is broken or severed. Safe optical power is ensured by redundant current and voltage safety checks.

19 Claims, 6 Drawing Sheets

LASER SAFETY METHOD AND DEVICE FOR DUPLEX OPEN LOOP PARALLEL OPTICAL LINK

FIELD OF THE INVENTION

The present invention relates to the field of fiber optic data communications, in particular fault detection arrangements for laser safety in a duplex open loop parallel optical link.

BACKGROUND OF THE INVENTION

Laser-based devices and systems have been used widely in the fields of, for example, communications, computing technology and medical technology. The lasers utilized in these systems have output optical powers that are potentially harmful to both people and equipment. For instance, such lasers are driven at such a power so as to have damaging effects if exposed to a human eye. Among the safety methods and systems that have been developed, Method and Apparatus for Laser Safety described in U.S. Pat. No. 5,999,549 (Freitag, et al.), which is a related patent that is incorporated herein by reference, resets a laser fault counter if a second laser fault condition is not detected within a predetermined reset time period after a laser is turned on.

In the field of fiber optic data communications, fiber optic data communications links must ensure the optical power being transmitted by the laser remains below a defined level, or a "safe" level, in the event of a single failure in the link so as to avoid the aforementioned potential harm to both people and equipment. The "safe" level may include, for example, a standard established by industry and/or governmental regulations.

For serial optical links, there are at least two exemplary methods for ensuring that laser-driving, optical power does not exceed the relevant "safe" level, thus ensuring the safety of the users and any surrounding people as well as preventing any damage to the apparatus by the laser optical power. A first example method includes setting the optical power delivered by the laser to a level that is well below the "safe" level and utilize circuits on the transmitter IC to detect when the optical power level exceeds the safe level. Since the optical power in serial optical links is most often controlled by a monitor photo diode control loop, the laser average optical power is known. Therefore, fault detection circuits are able to easily determine when the average optical power exceeds a threshold limit. That is, since the current in the monitor photodiode is proportional to the optical power output by the laser, the transmitter can detect when the monitor photodiode current exceeds a threshold limit.

A second example method for ensuring that laser-driving optical power does not exceed the safe level in a serial optical link includes an Open Fiber Control (OFC) handshake protocol. This example protocol is used when the laser-driving optical power in normal data mode is set above the safe level. Thus, when a serial optical link fiber is pulled, according to the OFC protocol, the laser light is pulsed at an extremely low duty cycle (on for approximately 150 psec, off for approximately 10 sec) to ensure that the average laser optical power does not exceed the safe level. Similar to the first method, fault detection circuits on the transmitter side also ensure that a fault in the corresponding laser driving circuit does not cause the optical power to exceed the safe level.

However, such example methods of ensuring that the laser optical power remains at or below a safe level are not applicable to open loop parallel optical links. That is, in open loop parallel optical links, the average optical power is unknown, because there are no monitor photodiodes, and multiple lasers are emitting light simultaneously. Thus, the example fault detection methods described above are inappropriate since the aggregate optical power in an open loop parallel optical link is above the safe level and is much higher than that of a serial link.

Figure 2:
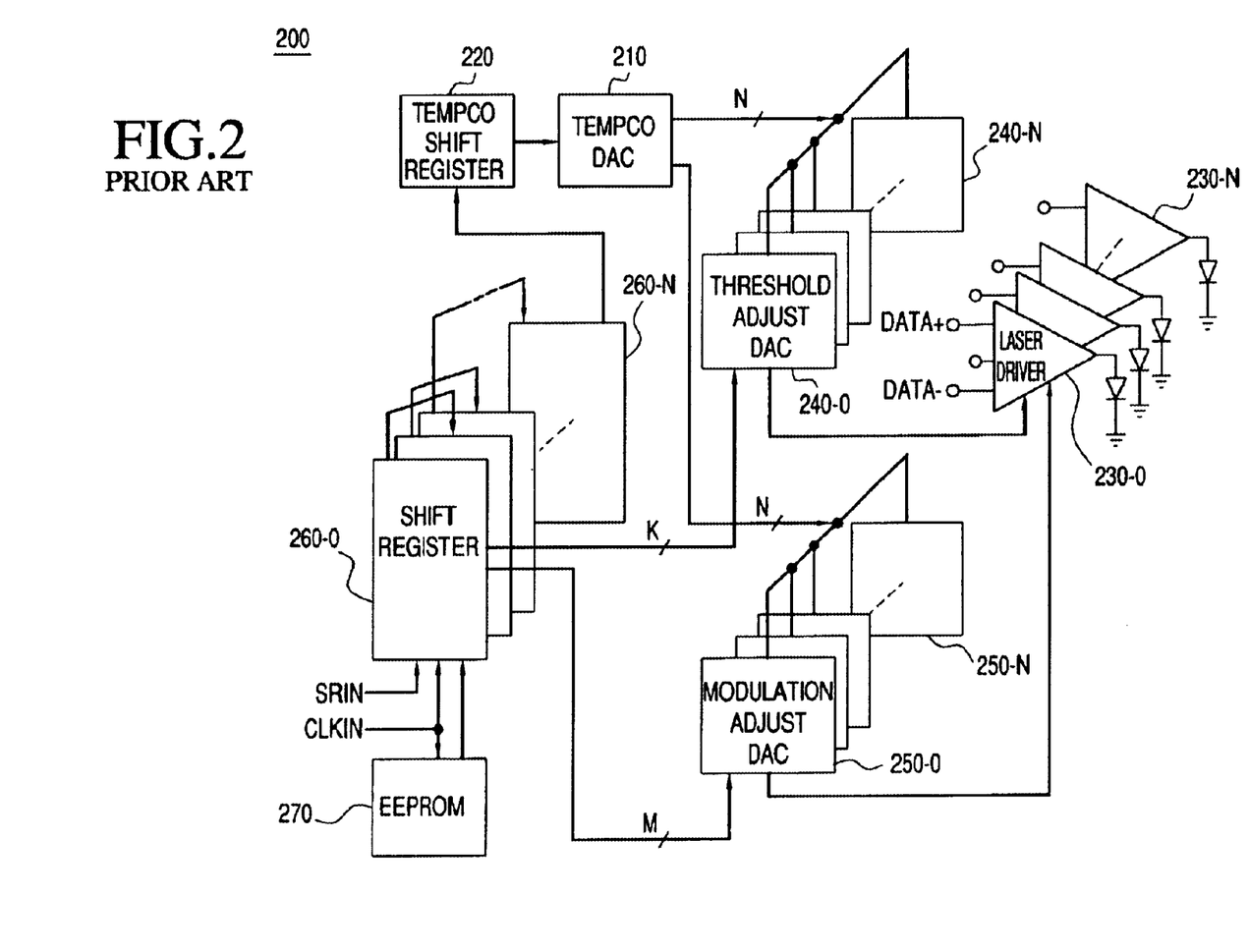
FIG. 2 shows an example of an open loop parallel optical transmitter according to the prior art.

For instance, FIG. 2 shows an open loop parallel optical transmitter which includes N+1 channels. The parallel optical transmitter 200 includes global temperature coefficient adjustment DAC (TEMPCO DAC) 210 and global temperature coefficient adjustment shift register (TEMPCO SHIFT REGISTER) 220 which holds bits for the TEMPCO DAC 210. Each of channels 0 through N include a respective laser driver 230, a threshold current adjustment DAC 240, a modulation current adjustment DAC 250, and a shift register 260 to hold the bits for each DAC. EEPROM 270 stores the bits in a non-volatile memory when the parallel transmitter is powered off. This parallel transmitter, however, does not show any method for preventing the aggregate optical power out of the lasers of channels 0 through N from exceeding the "safe" level.

SUMMARY OF THE INVENTION

Accordingly, an object of the present invention is to provide a method and apparatus for ensuring that the laser optical power does not exceed a "safe" level in an open loop parallel optical link. To that end, the present invention includes a duplex parallel optical link having a transmitter and receiver pair and a fiber optic ribbon that includes a designated number N of channels that cannot be split. The duplex transceiver includes a corresponding transmitter and receiver that are physically attached to each other and cannot be detached therefrom, so as to ensure safe laser optical power.

That is each duplex transceiver includes both a parallel optical transmitter and a parallel optical receiver packaged together along with a fiber ribbon cable where both directions of laser transmission are fixed together. The fiber ribbon cable includes N+1 channels which are bundled together and therefore cannot be split from each other. Channels 0 through N on both the transmitter and receiver sides include one channel which is designated as the safety channel. When the fiber ribbon is connected at both ends of the link, that is between both transceivers, the designated safety channel on both the transmitter and receiver sides function as normal data channels. However, when the fiber ribbon is pulled or is otherwise severed, the signal detectors at the receivers transmit a "loss of signal" condition to the respective transmitter. The "loss of signal" signals cause all of channels 0 through N, except for the designated safety channel, of the transmitter to shut down. That is, only the designated safety channel remains enabled.

The optical powers on the designated safety channels are set to a previously determined safe level at manufacturing. However, when the fiber is pulled or otherwise severed, a fault in the laser driver circuit could force a high current into the laser, causing the optical power to exceed the safe level. Fault detection circuits, therefore, must protect the designated safety channels from launching unsafe optical power in the event of a single failure.

The duplex transceivers each include an open loop parallel optical transmitter that includes fault detection circuits that detect a high current condition which causes the optical power to exceed the safe level when the ribbon fiber is pulled or otherwise severed.

In the event that the ribbon fiber is pulled or otherwise severed, since the aggregate power of a parallel link exceeds the safety limit, all of channels 0 through N except for the designated safety channel must be disabled by two mechanisms, which are regarded as being a redundant configuration. That is, if only one mechanism is used to disable the lasers of channels 0 through N, except for the designated safety channel, a single fault in the laser shut-down mechanism would enable the optical power to exceed the safe level. Thus, in a configuration having only one signal detector on the receiver side having its output stuck high, indicating that a signal is present, the aggregate optical power would exceed the limit if the fiber ribbon was pulled or otherwise severed.

The present invention also includes another redundant part of the safety scheme involving the laser current comparison function. A laser fault detection circuit is provided that compares the threshold current and modulation current in the laser of the designated safety channel with a redundant threshold current reference and a redundant modulation current reference. Such redundancy is provided so that, if a high laser current is caused by the circuit that generates the threshold current and modulation current, comparing these values to a current that is also generated from this faulty current generator would cause the optical power in the laser of the designated safety channel to remain at an unsafe level. Therefore, the threshold current and modulation current in the laser of the designated safety channel and the compare currents originate from independent sources.

Yet a further redundant part of the safety scheme involves reading the threshold DAC codes and modulation DAC codes into a shift register from an EEPROM upon power up. That is, if only part of the EEPROM data is read into the shift register, the threshold current or the modulation current could be too large, causing the optical power transmitted in the laser of the designated safety channel to be above the safe level. Thus, the present invention further includes two safety mechanisms, that are implemented to ensure all of the data is read into the shift register. The first method used is to ensure the last bit of the shift register gets loaded with a logic 0. Upon power up, the shift register is set to an all logic 1 state. The first bit out of the EEPROM is a logic 0, which should eventually get shifted to the last bit of the shift register. The second method to ensure that the shift register gets loaded correctly is to count the number of clock cycles required to shift the logic 0 into the last shift register location. The shift register is loaded correctly when the last location in the shift register is a logic zero and the clock cycle count is correct.

Yet another safety consideration provided by the present invention is PFET P1 330. If there is a glitch on the power supply to the transmitter that is low enough to trip the POR circuit, the shift register will be set to an all "1"s state. If this power supply glitch does not cause the memory pointer in the EEPROM to reset to memory location 0 (the first bit out must be a logic 0 for the redundant shift register read operation), data will be read into the shift register starting from the wrong memory location, possibly causing the laser currents to be too high in the designated safety channel. These large currents may force the optical power above the safety level. Thus, PEET P1 330 limit disables the power supply to the EEPROM when a power supply glitch occurs on the transmitter.

The fault detector circuit includes a voltage comparator which has an output that goes to a logic "1" value if the voltage on the laser of the designated safety channel exceeds a reference voltage. A threshold current comparator forces its output to a logic "1" when the threshold current of the designated safety channel exceeds the redundant current threshold. A modulation current comparator forces its output to a logic "1" when the modulation current of the designated safety channel exceeds the redundant current threshold. A multiplexer ensures that the voltage comparator functions properly during manufacturing tests. A failing voltage above the reference can be routed to the comparator to force the output thereof to a logic "1" value. A laser fault is indicated if the output of any one of the comparators goes to a logic "1" value.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written disclosure focuses on disclosing example embodiments of this invention, it should be clearly understood that the same is by way of illustration and example only and the invention is not limited thereto. The spirit and scope of the present invention are limited only by the terms of the appended claims.

The following represents brief descriptions of the drawings, wherein.

DETAILED DESCRIPTION OF A PREFERRED EMBODIMENT

Before beginning a detailed description of the invention, it should be noted that, when appropriate, like reference numerals and characters may be used to designate identical, corresponding or similar components in differing figure drawings. Further, in the detailed description to follow, example embodiments and values may be given, although the present invention is not limited thereto.

Figure 1:
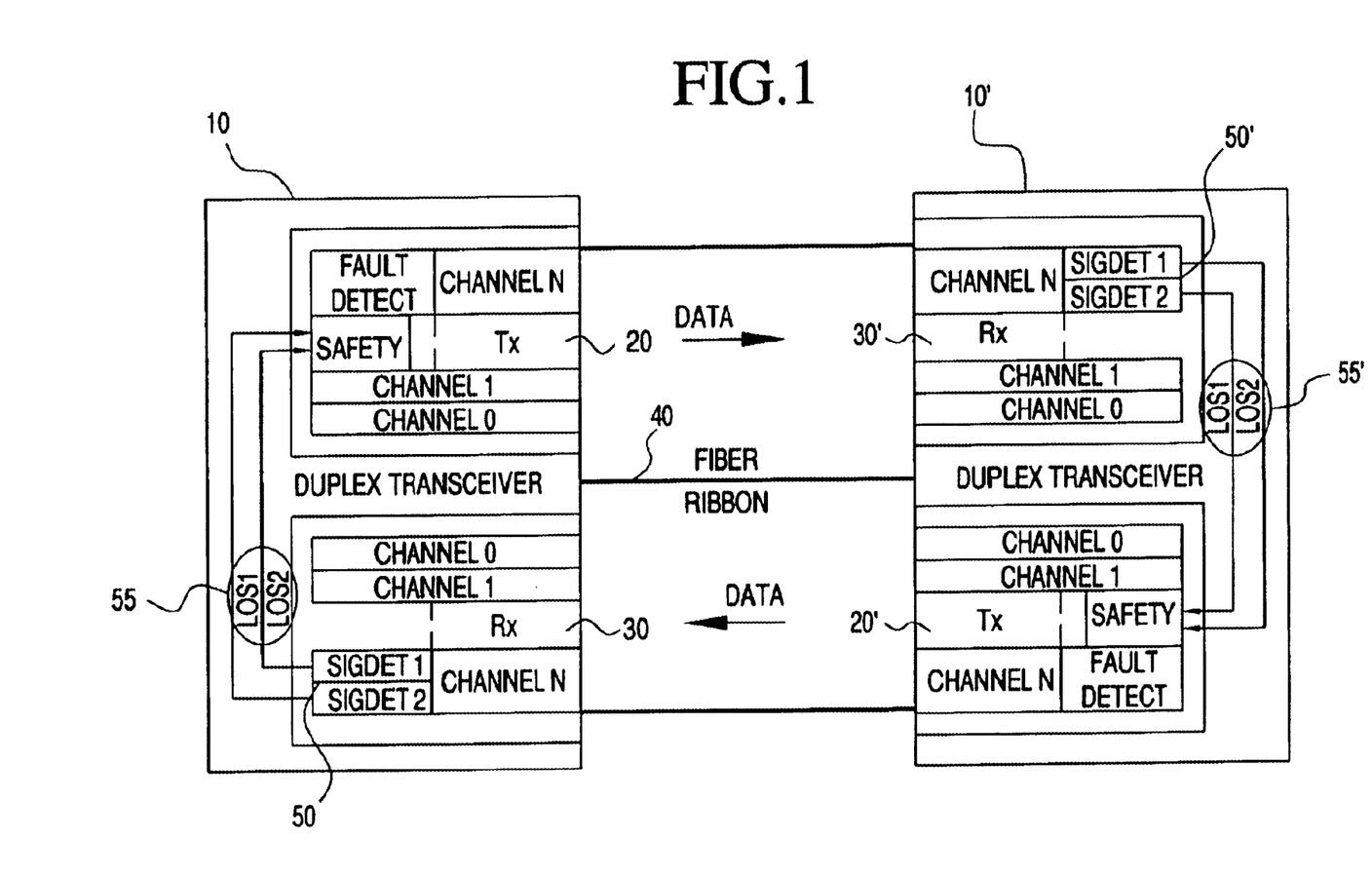
FIG. 1 shows an open loop parallel optical link between duplex transceivers according to an example of the present invention.

To ensure safe optical power is transmitted at all times in an open loop parallel optical link, the open loop parallel optical link is established between a pair of duplex transceivers 10 and 10', as shown in FIG. 1. [Each] The duplex [transceiver] transceivers 10 and 10' [includes] include both a parallel optical transmitter 20 and 20' and a parallel optical receiver 30 and 30' packaged together along with a fiber ribbon cable 40 where both directions of light travel are fixed together. Fiber ribbon cable 40 includes [N] N+1 fibers which are bundled together and cannot be split therefrom. Channels 0 through N on both the transmitter and receiver sides include one channel which is designated as the safety channel. When the fiber ribbon 40 is connected at both ends of the link, that is between both transceivers 10 and 10', the designated safety channel on both the transmitter and receiver sides function as normal data channels. However, when the fiber ribbon 40 is pulled or is otherwise severed, the signal detectors 50 and 50' at receivers 30 and 30' transmit a "loss of signal" (LOS1 and LOS2) 55 and 55' condition to the respective transmitter 20 and 20'. LOS1 or LOS2 cause all of channels 0 through N except for the designated safety channel of the transmitter of transceivers 10 and 10' to be shut down. That is, only the designated safety channel remains enabled.

The optical powers on the designated safety channels are set to a government or industry-implemented safe level at manufacturing thereof. However, when the fiber 40 is pulled or otherwise severed, a fault in the laser driver circuit could force a high current into the laser. This, in turn, may cause the optical power of the designated safety channel of the transmitter portions of the transceivers 10 and 10' to exceed the safety limit. Fault detection circuits, therefore, must protect the designated safety channels from launching unsafe optical power in the event of a single failure.

As set forth above, the parallel transmitter shown in FIG. 2 does not show any method for preventing the aggregate optical power out of channels 0 through N from exceeding the safe level. Accordingly, the duplex transceivers 10 and 10' according to the present invention each include an open loop parallel optical transmitter 20 and 20' that include fault detection circuits to thereby detect a high current condition which exceeds the safe level in the event that the ribbon fiber 40 is pulled or otherwise severed.

Figure 3:
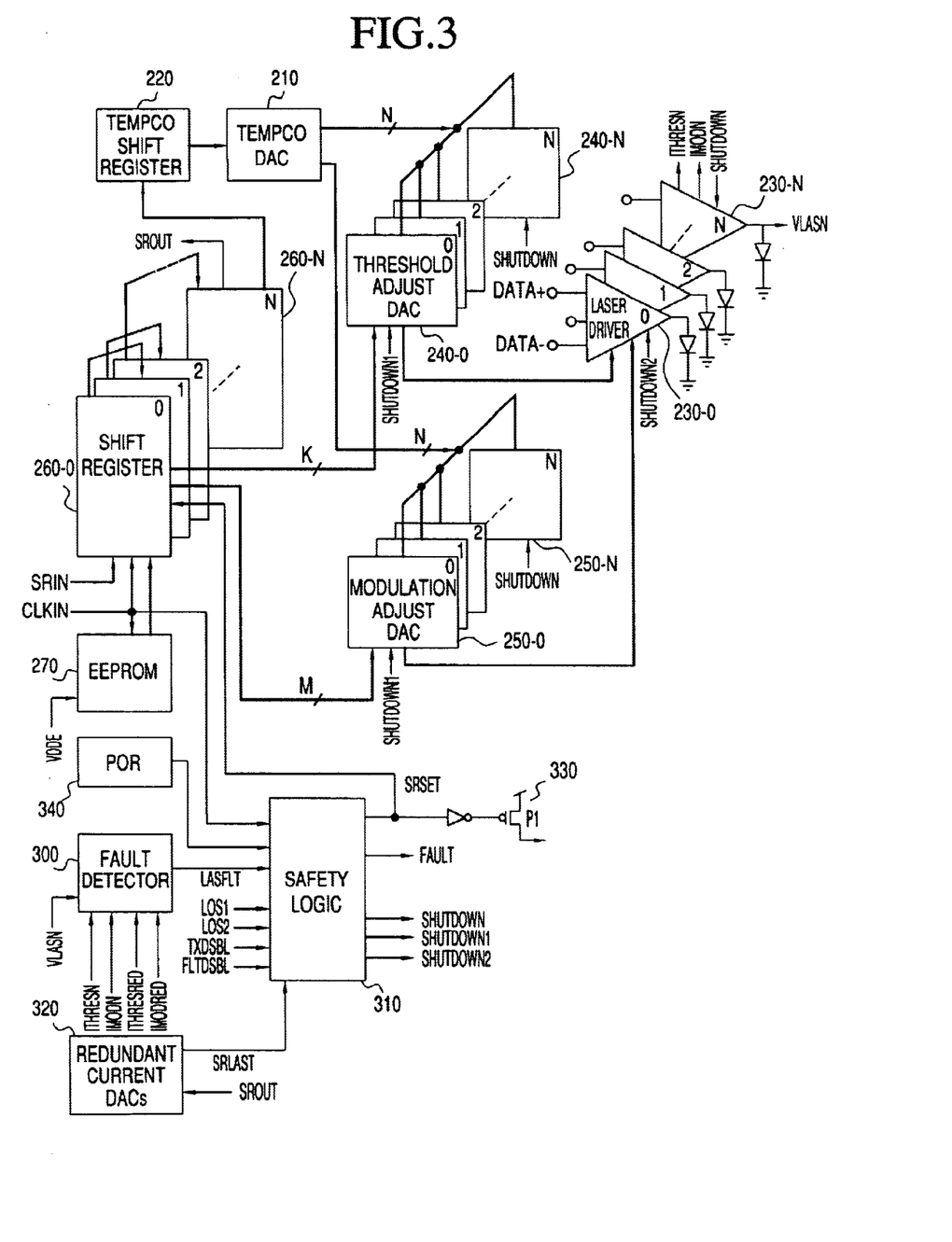
FIG. 3 shows an example of an open loop parallel optical transmitter according to the present invention.

Thus, FIG. 3 shows a parallel optical transmitter according to an example embodiment of the present invention which detects a high current condition which causes the optical power to exceed the safe level when the ribbon fiber 40 is pulled or otherwise severed. The example embodiment of the parallel optical transmitter according to the present invention includes all of the elements of the prior art example shown in FIG. 2, and further includes laser fault detection circuit 300, safety logic circuit 310, redundant current DACs 320, PFET P1 330 and POR 340.

As an example of the safe levels below which the designated safety channels must operate when the fiber ribbon 40 is pulled or otherwise severed, IEC Class 1 safety requires that the optical power remains below the limit in the event of one failure somewhere in the link. Since the aggregate power of a parallel link exceeds the safety limit, all of channels 0 through N except for the designated safety channel must be disabled by two mechanisms, indicated by the SHUTDOWN1 and SHUTDOWN2 signals in FIG. 3. "Shutdown" is used to disable the designated safety channel. It is asserted by the fault detection block which implies that one fault already exists. If "shutdown" fails, that would be a second failure, of which safeguards against are not required by established safety standards. This configuration is regarded as being a redundant configuration. That is, if only one mechanism is used to disable the lasers transmitted on all of channels 0 through N except for the designated safety channel, a single fault in the laser shutdown mechanism would enable the optical power to exceed the safe level.

Another redundant part of the safety scheme involves the laser current comparison function. FIG. 3 shows laser fault detection circuit 300 that compares the threshold current and modulation current in the laser of the designated safety channel with a redundant threshold current reference and a redundant modulation current reference. The rationale for such redundancy is that, if a high laser current is caused by the circuit that generates the threshold current and modulation current, comparing these values to a current that is also generated from this faulty current generator would cause the optical power in the laser of the designated safety channel to remain at an unsafe level. Therefore, the threshold current and modulation current in the laser of the designated safety channel and the compare currents originate from independent sources. The compare currents are generated by Redundant Current DACs 320.

A further redundant part of the safety scheme involves reading the threshold DAC codes and modulation DAC codes into a shift register from an EEPROM 270 upon power up. If only part of the EEPROM data is read into the shift register 260, the threshold current or the modulation current may be too large, thus causing the optical power transmitted in the laser of the designated safety channel to be above the safe level.

Accordingly, the present invention includes two safety mechanisms, that are implemented to ensure all of the data is read into the shift register 260. The first method used is to ensure the last bit of the shift register gets loaded with a logic 0. Upon power up, the shift register 260 is set to an all logic 1 state. The first bit out of EEPROM 270 is a logic 0, which should eventually get shifted to the last bit of the shift register 260. The second method to ensure that the shift register 260 gets loaded correctly is to count the number of clock cycles required to shift the logic 0 into the last shift register location. Shift register 260 is loaded correctly when the last location in the shift register is a logic zero and the clock cycle count is correct. The logic for this function is contained in the safety logic circuit 310 of FIG. 3.

A further safety function described in FIG. 3 is the purpose for PFET P1 330. If the transmitter's power supply voltage temporarily decreases (which is often called a "glitch") low enough to cause the POR circuit to indicate a low power supply condition, the shift register 260 will be set to an all "1" s state. If this power supply glitch does not also reset the EEPROM 270 (the first bit out of the EEPROM 270 must be a logic 0 for the redundant shift register read operation), data will be read into the shift register 260 starting from the wrong point in the EEPROM 270 thus causing the laser currents to be too high in the designated safety channel. These large currents could force the optical power above the safe level. PFET P1 330 therefore disables the power to the EEPROM 270 when a power supply glitch occurs on the transmitter.

Figure 5:
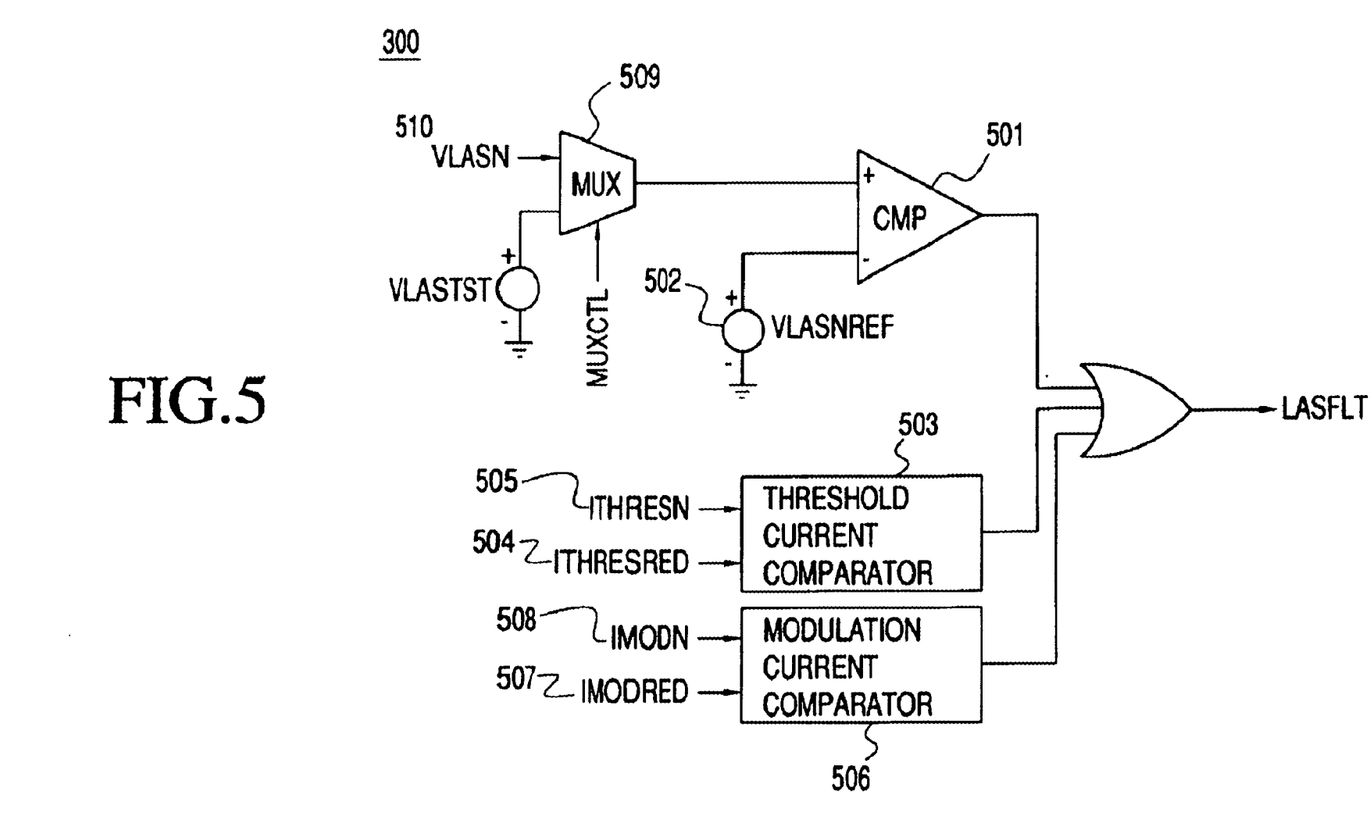
FIG. 5 shows an example of the fault detection block of the example embodiment of FIG. 3, according to the present invention.

Fault detector circuit 300 is shown in more detail in FIG. 5. Fault detector circuit 300 includes voltage comparator CMP 501, which has an output that goes to a logic "1" value if the voltage on the laser of the designated safety channel exceeds the reference voltage, VLASNREF 502. Threshold Current Comparator 503 forces its output to a logic "1" when the threshold current ITHRESN 505 of the designated safety channel exceeds the redundant current threshold represented by ITHRESRED (504). The Modulation Current Comparator 506 forces its output to a logic "1" when the modulation current of the designated safety channel exceeds the redundant current threshold represented by IMODRED 507. Multiplexer (MUX) 509 ensures that voltage comparator 501 functions properly during manufacturing tests. A failing voltage above VLASNREF 510 can be routed to CMP 501 to force the output thereof to a logic "1" value. A laser fault is indicated if the output of any one of the comparators goes to a logic "1" value.

Figure 4:
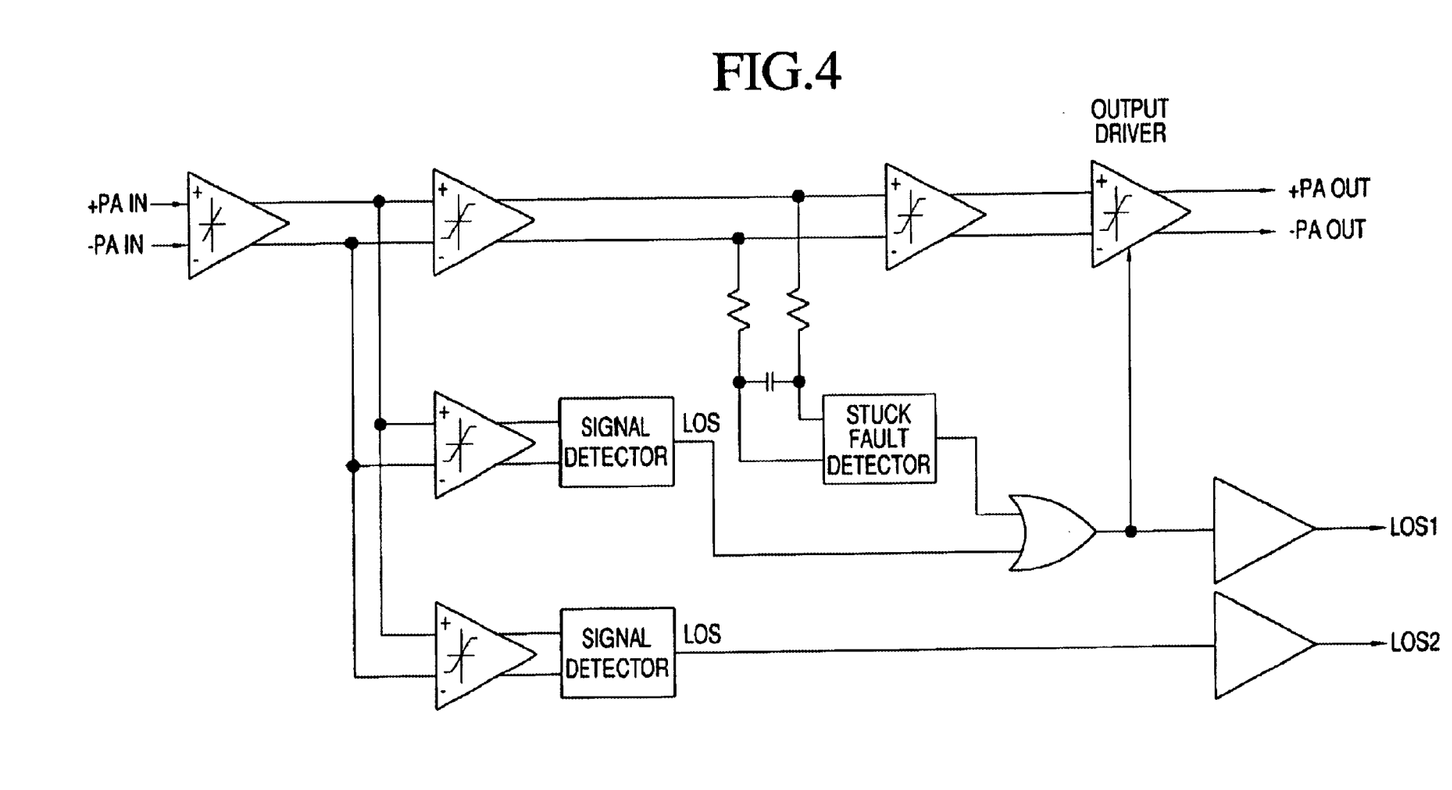
FIG. 4 shows an example of an optical receiver portion of the duplex transceivers shown in FIG. 1, according to the present invention.

The final safety function to be described is the redundant loss of signal detection function shown in FIG. 4. FIG. 4 shows several gain buffers, two loss of signal (LOS) detectors, and a stuck fault detector. Two LOS detectors are required, because one detector could be stuck high. This means the detector would continuously indicate that a signal is present even if the fiber is pulled or severed. The corresponding transmitter would, therefore, continue to emit light on all N+1 channels, exceeding the safety limit. Two detectors are required to indicate a loss of signal condition in the event of a failure of one of the detectors. The Stuck Fault Detector indicates a LOS condition if the differential signal path is stuck in a state that forces the LOS detectors to not indicate a loss of signal condition. The stuck fault detector does not need to be redundant because the single fault would be caused by the stuck differential signal path.

Figure 6:
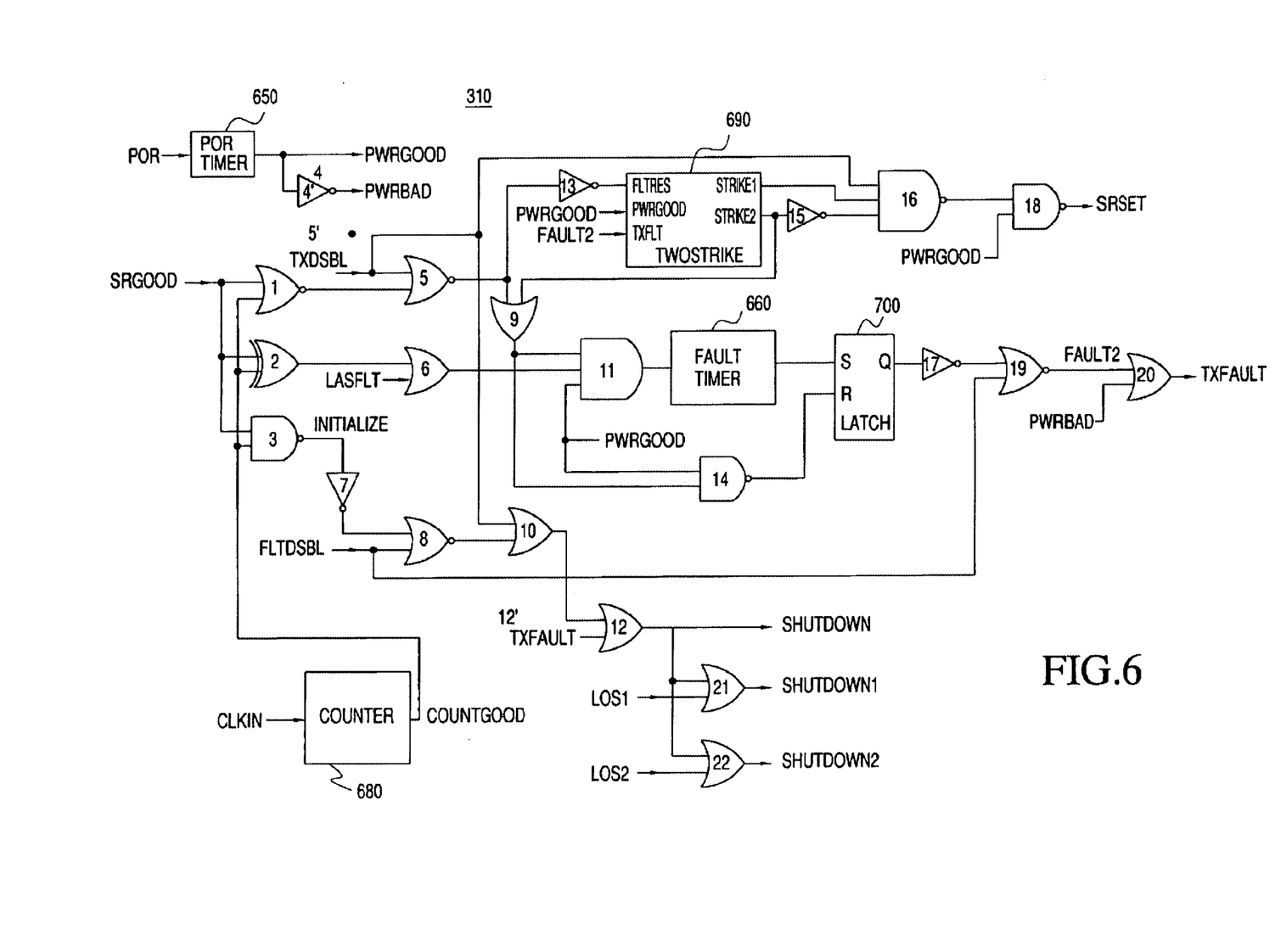
FIG. 6 shows an example of the safety logic box of the example embodiment of FIG. 3, according to the present invention.

FIG. 6 shows the safety logic block 310 of FIG. 3 in more detail. Safety logic block 310 includes timers 650, 660 and 690, a counter, and combination logic.

The following table lists the function of each input and output.

| SIGNAL | FUNCTION |
| --- | --- |
| POR | Indicates when the power supply voltage has crossed a threshold |
| TXDSBL | Clears laser fault indication on TXFAULT |
| SRGOOD | Indicates the correct data bit has been loaded into the last shift register location |
| COUNTGOOD | Logic 1 indicates the counter has reached the correct count |
| LASFLT | Indicates a laser fault condition exists in the laser driver of channel N |
| FLTDSBL | Used for test purposes to defeat the safety circuit |
| CLKIN | Clock used to load the data into the shift register from the EEPROM |
| TXFAULT | Indicates a fault has been detected for a period of time longer than the fault timer |
| LOS1 | One of two redundant signals indicating an optical signal has not been detected by the receiver (Rx) |
| LOS2 | One of two redundant signals indicating an optical signal has not been detected by the receiver (Rx) |
| SHUTDOWN | Disables the laser driver of the designated safety channel |
| SHUTDOWN1 | One of two redundant signals to disable the laser drivers of channels 0 through N, except for the designated safety channel |
| SHUTDOWN2 | One of two redundant signals to disable the laser drivers of channels 0 through N, except for the designated safety channel |
| SRSET | Sets all bits in the shift register to a logic 1 state |

During power up of the parallel optical link, POR timer 650 provides a delay from the time the power supply crosses an operational threshold level. This delay allows enough time for all the circuits on the transmitter 20 and 20' chip to power up.

A PWRGOOD signal 4 and a PWRBAD signal 4' are the possible outputs of the POR timer 650. PWRGOOD 4 is at a logic "1" level when the power supply voltage is above the operational threshold level. Fault Timer 660 provides a delay from the time a laser fault is indicated at the input thereof. Fault Timer 660 ensures that a real fault exists by not indicating a fault on its output until the fault on its input has existed for a period of time set by a counter within the fault timer 660.

The "Two Strike circuit" 690 allows the "transmitter disable" signal TXDSBL 5' to clear a laser fault indication on TXFAULT 12' as long as a second fault does not occur within a specified time from the failing edge of TXDSBL 5'. If a laser fault does occur within this specified time period, the TXDSBL 5' signal will not clear the fault indication on TXFAULT 12'. This prevents toggling the laser optical power at a frequency that forces the average optical power above the safety threshold.

In the combinational safety logic, NOR gates 1 and 5 prevent a fault being indicated while the data from the shift register is being loaded. After the shift register has finished loading from EEPROM 270 in FIG. 3, NOR gate 5 and OR gate 9 allow TXDSBL 5' to clear a fault at the input to Fault Timer 660 as long as the Strike2 output of the "Twostrike" circuit 690 is low. XOR gate 2 indicates an EEPROM 270 read fault to Fault Timer 660. NAND gate 3 and inverter 7 shutdown all of lasers 0 through, via the signals SHUTDOWN, SHUTDOWN1 and SHUTDOWN2, while the data from the EEPROM 270 is being read into the shift register 260.

OR gate 6 ORs a fault indication from Fault Detector 300 in FIG. 3 with a shift register read fault indication from XOR gate 2. To indicate a fault at the input of the Fault Timer 660, PWRGOOD must be high, the output of OR gate 6 must be high, and the output of OR gate 9 must be high. The delayed output of Fault Timer 660 is latched by SR Latch 700 to ensure a fault is indicated even if the fault-causing condition is remedied. SR Latch 700 can only be reset if the PWRGOOD signal is low, thus indicating that the power supply is low. SR Latch 700 can also be reset if TXDSBL is high as long as the "Twostrike" circuit 690 has not found two faults, that is STRIKE2 is low. Inverter 17 and NOR gate 19 allow the FLTDSBL signal to force the TXFAULT signal low for testing. OR gate 20 forces the TXFAULT output high if the power supply is low (PWRBAD=logic "1") or if a fault has been latched into the SR Latch 700, as long as FLTDSBL is low. Inverter 15, NAND gate 16 and NAND gate 18 set shift register 260 in FIG. 3 to an all logic "1" state if TXDSBL is high, as long as only one fault has been indicated (but not two faults) by the "Twostrike" circuit 690 and the power supply exceeds threshold. If the power supply is low, the shift register 260 is set to an all logic "1" state.

If a loss of signal condition is indicated by the receivers 30 and 30' by LOS1 or LOS2 being in a logic "1" state, all of channels 0 through N except for the designated safety channel will be disabled with the SHUTDOWN1 and SHUTDOWN2 signals.

The TXFAULT signal indicates to the host computer that there is a problem with the laser driver. The host can then try to clear the fault by forcing TXDSBL high according to the description of the "Twostrike" circuit set forth above. The open loop and parallel nature of the optical link requires specialized fault detection and safety logic circuits to ensure the optical power of the parallel transmitter does not exceed the safety limit. The invention described above implements this safety scheme.

This concludes the description of the example embodiments. Although the present invention has been described with reference to illustrative embodiments thereof, it should be understood that numerous other modifications and embodiments can be devised by those skilled in the art that will fall within the scope and spirit of the principals of the invention. More particularly, reasonable variations and modifications are possible in the component parts and/or arrangements of the subject combination arrangement within the scope of the foregoing disclosure, the drawings and the appended claims without department from the spirit of the invention. In addition to variations and modifications in the component parts and/or arrangements, alternative uses will also be apparent to those skilled in the art.

We claim:

1. A method for regulating optical power in an open loop parallel optical link upon the occurrence of an open fiber therein, said method comprising:
   (a) detecting an open fiber in an open loop parallel fiber optic link between a first transceiver that includes a transmitter and a receiver and a second transceiver that includes a transmitter and a receiver, wherein said fiber optic link includes N+1 channels, and wherein step (a) comprises detecting, with a means for detecting, an open fiber in the receiver of either of said first transceiver and said second transceiver;
   (b) disabling data transmission on all of channels 0 through N except for one designated safety channel between said first transceiver and said second transceiver, wherein step (b) comprises disabling, with a means for disabling, data transmission in at least one of said first and second transceivers; and
   (c) transmitting data from either of said first transceiver or said second transceiver on said safety channel at or below a threshold optical power level, wherein step (c) comprises reducing, with a means for reducing, optical power in the transmitters of said first and second transceivers.

2. A method according to claim 1, wherein said receiver that detects the open fiber in said fiber optic link between said first transceiver and said second transceiver informs the transmitter in the same transceiver as said receiver that detects the open fiber of a loss of signal.

3. A method according to claim 1, wherein said receivers of both of said first transceiver and said second transceiver include redundant loss of signal detectors to provide said means for detecting.

4. A method according to claim 1, wherein said means for disabling data transmission comprises redundant disabling mechanisms.

5. A method according to claim 1, wherein step (c) includes:
   comparing a threshold current and modulation current in the laser of said designated safety channel with a redundant threshold current reference and a redundant modulation current reference,
   wherein the redundant threshold current reference and the redundant modulation current reference are generated by an independent source; and
   disabling data transmission on said designated safety channel between said first transceiver and said second transceiver if either of the threshold current and the modulation current exceed the redundant threshold current reference and redundant threshold modulation current reference in the laser of said designated safety channel, respectively.

6. A method according to claim 5, wherein the step of comparing a threshold current and modulation current is conducted using comparators.

7. A method according to claim 1, wherein step (c) includes determining that all data is read into a shift register from a non-volatile memory.

8. A method according to claim 7, wherein said non-volatile memory is an EEPROM.

9. A method according to claim 1, wherein the first transceiver comprises a plurality of first transmitters and a plurality of first receivers, wherein the second transceiver comprises a plurality of second transmitters and a plurality of second receivers, and wherein the step of detecting an open fiber is conducted using detectors disposed at the first and second receivers.

10. An open loop parallel optical link having optical power therein regulated upon the occurrence of an open fiber, comprising:
    a first transceiver;
    a second transceiver; and
    a fiber optic link, including N+1 channels, that connects said first transceiver to said second transceiver;
    wherein the first and second transceivers comprise means for detecting open fibers and means for disabling channels;
    wherein, upon detection by either of said first transceiver or said second transceiver, that said fiber optic link has an open fiber, data transmission on all of channels 0 through N except for one designated safety channel is disabled on said fiber optic link; and
    wherein, upon the disabling of data transmission on all of channels 0 through N except for said one designated safety channel on said fiber optic link, data is transmitted from either of said first transceiver or said second transceiver on said safety channel at or below a threshold power level.

11. An open loop parallel optical link according to claim 10, wherein both of said first transceiver and said second transceiver include a duplex transceiver having an attached transmitter and receiver.

12. An open loop parallel optical link according to claim 11, wherein the means for detecting open fibers comprises sensors at the receivers, and wherein the open fiber in said fiber optic link between said first transceiver and said second transceiver is detected by at least one of the sensors of either of said first transceiver and said second transceiver.

13. An open loop parallel optical link according to claim 12, wherein a sensor that detects the open fiber in said fiber optic link between said first transceiver and said second transceiver informs the attached transmitter of a loss of signal.

14. An open loop parallel optical link according to claim 10, wherein the means for detecting open fibers of both of said first transceiver and said second transceiver includes redundant loss of signal detectors.

15. An open loop parallel optical link according to claim 10, wherein the means for disabling comprises redundant disabling mechanisms.

16. An open loop parallel optical link according to claim 10, wherein transmitting data between said first transceiver and said second transceiver at or below the threshold power level includes:
    comparing a threshold current and modulation current in the laser of said designated safety channel with a redundant threshold current reference and a redundant modulation current reference,
    wherein the redundant threshold current reference and the redundant modulation current reference are generated by an independent source; and
    disabling data transmission on said designated safety channel between said first transceiver and said second transceiver if either of the threshold current and the modulation current exceed the redundant threshold current reference and redundant threshold modulation current reference in the laser of said designated safety channel, respectively.

17. A method according to claim 16, wherein the step of comparing a threshold current and modulation current is conducted using comparators.

18. An open loop parallel optical link according to claim 10, wherein transmitting data between said first transceiver and said second transceiver at or below the threshold power level includes determining that all data is read into a shift register from a non-volatile memory.

19. An open loop parallel optical link according to claim 18, wherein said non-volatile memory is an EEPROM.

* * * * *